(12) United States Patent
Bailey

(10) Patent No.: US 8,804,992 B2
(45) Date of Patent: Aug. 12, 2014

(54) ONE-PIECE HEADBAND FOR A BLUETOOTH HEADSET

(71) Applicant: Melissa P. Bailey, East Orange, NJ (US)

(72) Inventor: Melissa P. Bailey, East Orange, NJ (US)

(*) Notice: Subject to any disclaimer, the term of this patent is extended or adjusted under 35 U.S.C. 154(b) by 37 days.

(21) Appl. No.: 13/734,113

(22) Filed: Jan. 4, 2013

(65) Prior Publication Data

US 2014/0193021 A1    Jul. 10, 2014

(51) Int. Cl.
*H04R 25/00* (2006.01)
*H04R 5/033* (2006.01)
*H01Q 1/27* (2006.01)
*H04B 1/38* (2006.01)
*H04M 1/05* (2006.01)

(52) U.S. Cl.
CPC .............. *H04R 5/0335* (2013.01); *H01Q 1/273* (2013.01); *H04B 2001/3866* (2013.01); *H04B 1/385* (2013.01); *H04M 1/05* (2013.01)
USPC ........ 381/378; 379/430; 455/575.2; 343/718; 381/376

(58) Field of Classification Search
CPC .............. H04R 5/03358; H01Q 1/273; H04B 2001/3866; H04B 1/385; H04M 1/05
USPC ................ 381/376, 378; 379/430; 455/575.2; 343/718

See application file for complete search history.

(56) References Cited

U.S. PATENT DOCUMENTS

| RE20,871 E | 10/1938 | Donoher | |
|---|---|---|---|
| 6,980,165 B2 * | 12/2005 | Yuasa et al. | 343/718 |
| 7,024,013 B1 * | 4/2006 | Van Dam et al. | 381/376 |
| 7,532,718 B2 * | 5/2009 | Cohen et al. | 379/430 |
| 8,452,259 B2 * | 5/2013 | Ellis et al. | 455/410 |
| 2008/0272161 A1 * | 11/2008 | Roche | 224/181 |
| 2010/0056055 A1 | 3/2010 | Ketari | |
| 2011/0216931 A1 * | 9/2011 | Bui | 381/333 |

* cited by examiner

*Primary Examiner* — Curtis Kuntz
*Assistant Examiner* — Ryan Robinson
(74) *Attorney, Agent, or Firm* — Paul R. Martin

(57) ABSTRACT

A headset for use with electronic communications devices such as a cellular telephone and which includes a unitary, one-piece headband that includes a hair comb. The one-piece headband also includes a volume control and an on/off switch and an aerial wire intertwined with the teeth of the comb. Earbuds are also attached to the one-piece headband to be integral and unitary therewith.

4 Claims, 1 Drawing Sheet

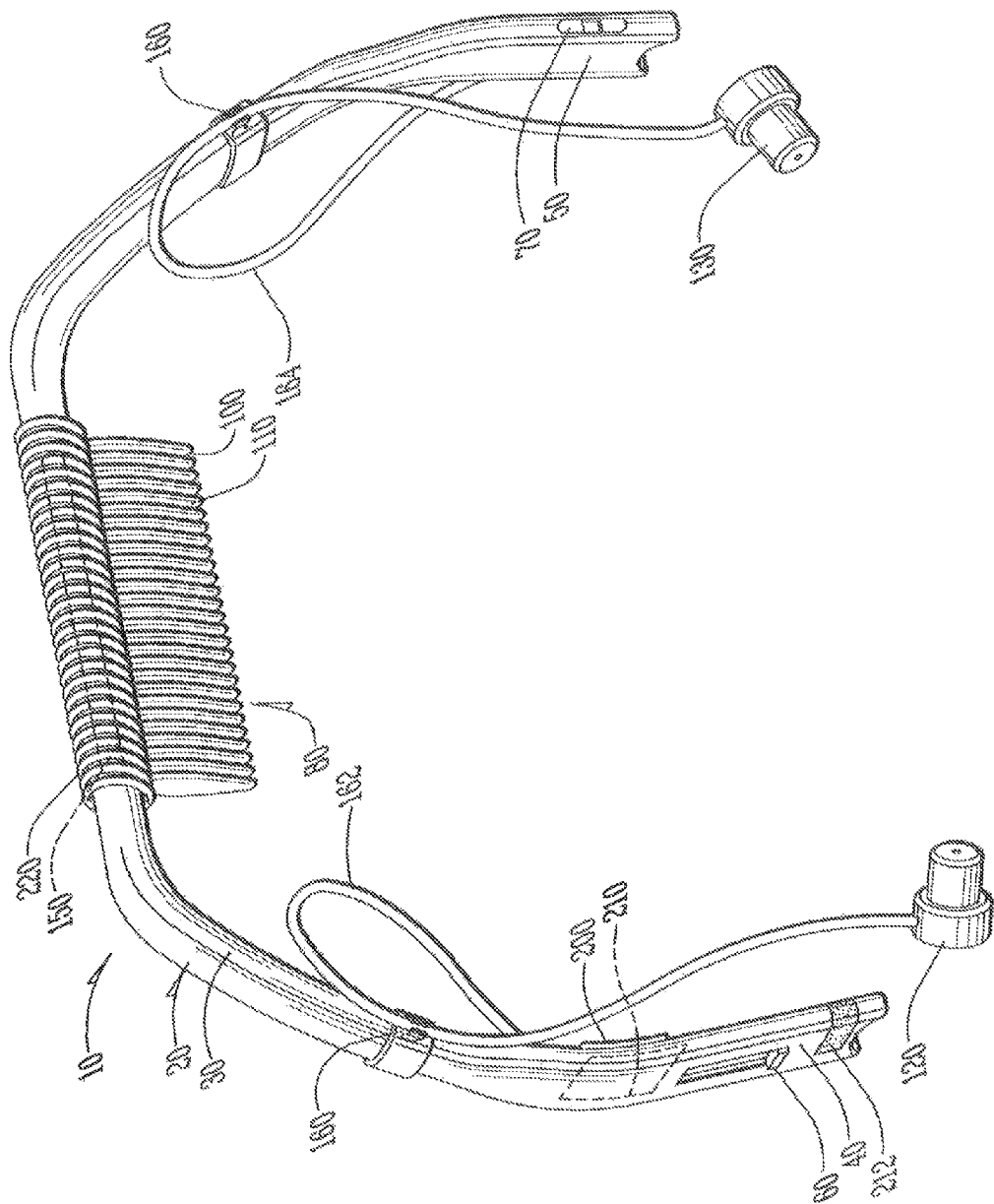

ONE-PIECE HEADBAND FOR A BLUETOOTH HEADSET

TECHNICAL FIELD OF THE INVENTION

The present invention relates to the general art of communication devices, and to the particular field of Bluetooth® headset.

BACKGROUND OF THE INVENTION

In the busy modern world, the option of carrying personal electronic devices, such as telephones, radios, and musical play-back devices has allowed individuals more freedoms and the ability to communicate, work, and/or be entertained while on the move. The concept of hands-free use of such equipment followed on the heels of the prior are pertaining to hands-free use of cordless telephones.

As such, wireless communication devices have become an important and, indeed, necessary part of everyday life. The evolution of the cellular telephone and other wireless communication devices allows individuals to remain in constant contact with each other at any particular time, regardless of geographical location. In recent years, advancements have been made to enhance the portability and usability and, in some cases, the aesthetic appeal of such electronic communication devices.

To date, however, most solutions to portability have either required a cellular telephone user to have at least one hand tied up holding their cellular telephone or opt for additional equipment, such as plug-in microphone and speaker assemblies requiring cords that can become entangled or pulled loose from the cellular telephone and most often have poor quality in both the speaker sound production and the microphone sensitivity. Other designs have attempted to solve the problem of carrying and operating electronic equipment such as radios and MP3 playback devices. The majority of those solutions, however, involve the electronic device being carried at the waist or elsewhere and long, cumbersome wires running to some form of headset or earpieces. While worn on the belt or elsewhere on the body, the playback device requires a long speaker cord running to the speakers worn by the user.

Further advancements which have been made to the portability and usability of such devices include, for example, the development of BlueTooth® technology (an RF-based, peer-to-peer wireless communication platform) allows users to talk to each other via a wireless connection, in a "hands-free" manner, through a cellular telephone (or other communication device). Bluetooth® is a proprietary open wireless technology standard for exchanging data over short distances (using short-wavelength radio transmissions in the ISM band from 2400-2480 MHz) from fixed and mobile devices, creating personal area networks (PANs) with high levels of security. Created by telecoms vendor Ericsson in 1994, [1] it was originally conceived as a wireless alternative to RS-232 data cables. It can connect several devices, overcoming problems of synchronization.

Bluetooth® is managed by the Bluetooth Special Interest Group, which has more than 16,000 member companies in the areas of telecommunication, computing, networking, and consumer electronics. The SIG oversees the development of the specification, manages the qualification program, and protects the trademarks. To be marketed as a Bluetooth® device, it must be qualified to standards defined by the SIG.

Bluetooth® uses a radio technology called frequency-hopping spread spectrum, which chops up the data being sent and transmits chunks of it on up to 79 bands (1 MHz each; centered from 2402 to 2480 MHz) in the range 2,400-2,483.5 MHz (allowing for guard bands). This range is in the globally unlicensed Industrial, Scientific and Medical (ISM) 2.4 GHz short-range radio frequency band. It usually performs 800 hops per second, with AFH enabled.

Originally Gaussian frequency-shift keying (GFSK) modulation was the only modulation scheme available; subsequently, since the introduction of Bluetooth® 2.0+EDR, π/4-DQPSK and 8DPSK modulation may also be used between compatible devices. Devices functioning with GFSK are said to be operating in basic rate (BR) mode where an instantaneous data rate of 1 Mbit/s is possible. The term Enhanced Data Rate (EDR) is used to describe π/4-DPSK and 8DPSK schemes, each giving 2 and 3 Mbit/s respectively. The combination of these (BR and EDR) modes in Bluetooth® radio technology is classified as a "BR/EDR radio".

Bluetooth® is a packet-based protocol with a master-slave structure. One master may communicate with up to 7 slaves in a piconet; all devices share the master's clock. Packet exchange is based on the basic clock, defined by the master, which ticks at 312.5 μs intervals. Two clock ticks make up a slot of 625 μs; two slots make up a slot pair of 1250 μs. In the simple case of single-slot packets the master transmits in even slots and receives in odd slots; the slave, conversely, receives in even slots and transmits in odd slots. Packets may be 1, 3 or 5 slots long but in all cases the master transmit will begin in even slots and the slave transmit in odd slots.

Bluetooth® provides a secure way to connect and exchange information between devices such as faxes, mobile phones, telephones, laptops, personal computers, printers, Global Positioning System (GPS) receivers, digital cameras, and video game consoles.

A master Bluetooth® device can communicate with a maximum of seven devices in a piconet (an ad-hoc computer network using Bluetooth® technology), though not all devices reach this maximum. The devices can switch roles, by agreement, and the slave can become the master (for example, a headset initiating a connection to a phone will necessarily begin as master, as initiator of the connection; but may subsequently prefer to be slave).

The Bluetooth® Core Specification provides for the connection of two or more piconets to form a scatternet, in which certain devices simultaneously play the master role in one piconet and the slave role in another.

At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is (in theory) supposed to listen in each receive slot, being a master is a lighter burden than being a slave. Being a master of seven slaves is possible; being a slave of more than one master is difficult. The specification is vague as to required behaviour in scatternets.

Many USB Bluetooth® adapters or "dongles" are available, some of which also include an IrDA adapter. Older (pre-2003) Bluetooth® dongles, however, have limited capabilities, offering only the Bluetooth® Enumerator and a less-powerful Bluetooth® Radio incarnation. Such devices can link computers with Bluetooth® with a distance of 100 meters, but they do not offer as many services as modern adapters do.

Bluetooth® is a standard wire-replacement communications protocol primarily designed for low power consumption, with a short range (power-class-dependent, but effective ranges vary in practice; see table below) based on low-cost transceiver microchips in each device. Because the devices use a radio (broadcast) communications system, they do not have to be in visual line of sight of each other, however a quasi optical wireless path must be viable.

The effective range varies due to propagation conditions, material coverage, production sample variations, antenna configurations and battery conditions. In most cases the effective range of Class 2 devices is extended if they connect to a Class 1 transceiver, compared to a pure Class 2 network. This is accomplished by the higher sensitivity and transmission power of Class 1 devices.

Bluetooth® technology has been used and incorporated in a vast number of products, including, for example, wireless control of and communication between a mobile phone and a handsfree headset (this was one of the earliest applications to become popular); wireless control of and communication between a mobile phone and a Bluetooth® compatible car stereo system; and wireless Bluetooth® headset and Intercom; as well as many others.

Devices that employ BlueTooth® technology are often worn by a user around his or her ear, in proximity to a cellular telephone or other communication device. While these devices have provided a reliable means to talk with another person via a wireless connection, in a "hands-free" manner, the devices lack preferred aesthetic appeal. For this reason, others have attempted to develop wireless communication devices, which allow users to talk with another person in a "hands-free" manner, whereby the devices are disguised or camouflaged to the ordinary viewer. Despite such currently-available devices, a need exists for improved wireless communication devices that allow users to talk with each other in a "hands-free" manner, which are preferably adorned in such a way that causes the devices to resemble the look of jewelry or other personal accessories. Preferably, such improved devices will be modular, such that the means by which the devices are adorned may be easily adjusted to accommodate the wants and desires of the user.

Over 100 million Bluetooth® headsets are sold a year, and yet, these devices do not have a convenient way to carry them when not in use. Most people either carry in their ears, or risk loosing them. Furthermore, users are now compelled to carry a new device with them, and there has not been any successful attempt to either integrate Bluetooth® headset functionality into existing devices, or to integrate more functionality into Bluetooth® headsets.

More and more personal data is being stored on ever smaller and more mobile devices. The risk that sensitive data regarding identity, access codes, or business information could be compromised if one of these devices is misplaced increases with the amount of information that can be stored on them and their increasingly pervasive use. Requiring the entry of security codes or keys is a partial solution, but the efficacy of this solution decreases to the extent that the data onboard the device can be used if the mobile device lands in the wrong hands.

Portable electronic devices such as cellular telephones, personal digital assistants (PDAs), wireless email devices, instant messaging devices, pagers, portable compact disk (CD) players, portable MP3 players, and others are often forgotten, lost, or stolen (a "PED" includes any portable device that can be used for communication, performing intellectual and/or physical work, and/or entertainment).

However, even with the advances associated with the above-mentioned developments, there is always a need in this industry for further advances. For example, if portability advances can be combined with aesthetic needs and advances, great improvements can be made and consumer acceptance is likely to be enhanced.

While the inventor is aware of various devices for mounting earphones or speakers on a user's head, such as disclosed in documents such as Published Applications 2004/0216931, 2005/0284981, 20070053544 and 7120247, as well as holders directed to aesthetic appeal such as disclosed in documents such as Published Application 2011/0216931, none of these devices combine efficiency, aesthetics and reliability. In fact, the components of many of these devices are subject to becoming separated from each other thereby requiring the user to keep up with several separate components. This raises the possibility that components will be misplaced or at least not readily available when desired. Searching for a component, such as an earphone, is frustrating as well as time consuming.

Therefore, there is a need for a means for efficiently using hands-free devices such as a cellular telephone which is also aesthetically pleasing and is not subject to the drawbacks associated with units having separate parts.

More specifically, a need exists for a method and apparatus for a Bluetooth® assistant that can be carried conveniently, that provides Bluetooth® headset functionality, and that is aesthetically pleasing and is not subject to being lost or having parts thereof lost or separated from the main unit.

SUMMARY OF THE INVENTION

The above-discussed disadvantages of the prior art are overcome by a headset for use with electronic communications devices such as a cellular telephone and which includes a unitary, one-piece headband that includes a hair comb. The one-piece headband also includes a volume control and an on/off switch and an aerial wire intertwined with the teeth of the comb. Earbuds are also attached to the one-piece headband to be integral and unitary therewith. The one-piece structure of the headband maintains all the important elements of the headset together in one piece so there is no possibility of any of the important elements of the headset becoming separated from the remaining elements. In this manner, a user is not likely to lose one or more of the elements and all the elements will be readily available for use when needed. This avoids the frustration of having to look for one element of the unit before the unit is used. The headband structure of the one-piece unit adds aesthetic appeal to the unit as well.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURE

The invention can be better understood with reference to the following drawing and description. The components in the FIGURE are not necessarily to scale, emphasis instead being placed upon illustrating the principles of the invention. Moreover, in the FIGURE, like referenced numerals designate corresponding parts throughout the view.

FIG. 1 is a perspective view of a headband embodying the present invention for use with a Bluetooth® headset.

DETAILED DESCRIPTION OF THE INVENTION

Referring to the FIGURE, it can be understood that the present invention is embodied in a headset 10 for an electronic communications device, such as a cellular telephone or the like, which is aesthetically pleasing as well as efficient to use. The efficiency of use results because the headset comprises a unitary, one-piece body 20 in which all the important elements are located. The one-piece nature of the body prevents loss or separation of these elements and ensures that they all will be in one place when needed.

The one-piece body includes a headband 30 that is adapted to fit on top of a user's head when the headset is in use. Headband 30 includes a headband first end 40 located to be positioned adjacent to the user's ear when the headband is positioned on the user's head, and a headband second end 50 located to be positioned adjacent to the user's ear when the headband is positioned on the user's head. A volume control 60 is located in the headband first end, and an on/off switch 70 is located in the headband second end.

The one-piece body further has a hair comb 80 mounted on the headband to engage the user's hair when the headband is positioned on the user's head and maintain the headband in place on the user during use. The hair comb has a multiplicity of teeth, such as teeth 100 and 110, which are spaced apart from each other in the manner of a comb. A first earbud 120 is mounted on the headband first end, and a second earbud 130 is mounted on the headband second end. The earbuds are integral with the headset body so they are not likely to become separated from the remainder of the headset and any wires associated therewith are not likely to become tangled. As is well understood, tangled wires are a source of user frustration which is best avoided if a device is to enjoy commercial success. The one-piece body further includes an aerial wire 150 intertwined among the teeth of the hair comb and wire mounts, such as wire mount 160, in which the aerial wire is mounted to be mounted on the headband. As discussed above, Bluetooth® operability is a function of the antenna wire. The presence of a comb may enhance the range of operability. The wire mounts can also be used to hold wires, such as wires 162 and 164, associated with the earbuds, in place to avoid tangling or entanglement with other devices.

Control circuitry 200 is located in the one-piece headband and includes circuitry 210 which is adapted to connect the earbuds to a smart phone via an over-the-air connection. The details of the circuitry will not be provided since these details do not form part of the invention claimed herein. A microphone 212 can also be included in the body of the headset.

Headset 10 can further include jewelry wire 220 wrapped around the comb and interposed between the teeth of the comb. This wire adds further aesthetic appeal to the overall device.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A headset for an electronic communications device comprising:
   A) a unitary, one-piece body which includes
      a headband that is adapted to fit on top of a user's head when the headset is in use, a headband first end located to be positioned adjacent to the user's ear when the headband is positioned on the user's head, a headband second end located to be positioned adjacent to the user's ear when the headband is positioned on the user's head, a volume control located in the headband first end, an on/off switch located in the headband second end, a hair comb mounted on the headband to engage the user's hair when the headband is positioned on the user's head and maintain the headband in place on the user during use, the hair comb having a multiplicity of teeth which are spaced apart from each other;
   B) a first earbud mounted on the headband first end;
   C) a second earbud mounted on the headband second end;
   D) an aerial wire intertwined among the teeth of the hair comb; and
   E) wire mounts on the headband in which the aerial wire is mounted to be mounted on the headband.

2. The headset defined in claim 1 further including control circuitry located in the one-piece headband to be one-piece with the body.

3. The headset defined in claim 2 wherein the control circuitry includes circuitry which is adapted to connect the earbuds to a smart phone via an over-the-air connection.

4. The headset defined in claim 3 further including jewelry wire wrapped around the comb and interposed between the teeth of the comb.

* * * * *